US006446433B1

(12) United States Patent
Holt et al.

(10) Patent No.: US 6,446,433 B1
(45) Date of Patent: Sep. 10, 2002

(54) HYDRAULIC CONTROL SYSTEM FOR IMPROVING PUMP RESPONSE AND DYNAMIC MATCHING OF PUMP AND VALVE

(75) Inventors: Bradford J. Holt, Peoria; John J. Krone, Dunlap; Douglas W. Koehler, Peoria; Michael A. Cobo, St. Charles, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/661,714

(22) Filed: Sep. 14, 2000

Related U.S. Application Data

(60) Provisional application No. 60/153,792, filed on Sep. 14, 1999.

(51) Int. Cl.[7] ........................................ F16D 31/02

(52) U.S. Cl. ........................................ 60/433; 91/459

(58) Field of Search .......................... 91/454, 462, 459; 60/433, 368

(56) References Cited

U.S. PATENT DOCUMENTS 3,956,891 A 5/1976 Karazija
4,663,714 A 5/1987 Cornell et al.
5,182,908 A 2/1993 Devier et al.
5,214,916 A 6/1993 Lukich
5,245,827 A 9/1993 Durant et al.
5,305,681 A 4/1994 Devier et al.
5,383,390 A 1/1995 Lukich
5,520,262 A 5/1996 Marcott
5,584,224 A * 12/1996 Davies et al. ................. 91/459
5,680,760 A 10/1997 Lunzman
5,701,933 A 12/1997 Lunzman
5,868,059 A * 2/1999 Smith .......................... 91/454
5,870,941 A 2/1999 Spillner et al.
5,960,695 A * 10/1999 Aardema et al. ............. 91/459
6,009,708 A * 1/2000 Miki et al. ..................... 60/414
6,131,391 A * 10/2000 Poorman ..................... 91/454
6,131,500 A * 10/2000 Moncrief ..................... 91/454
6,199,378 B1 * 3/2001 Aardema et al. ............. 60/468

* cited by examiner

*Primary Examiner*—F. Daniel Lopez
*Assistant Examiner*—Igor Kershteyn
(74) *Attorney, Agent, or Firm*—Blackwell Sanders Peper Martin LLP

(57) ABSTRACT

A hydraulic control system having a pump for delivering fluid under pressure from a fluid reservoir, a hydraulic actuator selectively driven by the fluid, the system comprises a main flow control valve connected between the pump and the actuator for selectively providing the fluid to and from the actuator, and a control unit connected to the main flow control valve for controlling operation of the main flow control valve to control the rate of change of the area of the main flow control valve relative to the delivery of fluid from the pump, and the control unit connected to the pump to increase or decrease the actual pump command proportional to the inverse of the pump command.

11 Claims, 4 Drawing Sheets

HYDRAULIC CONTROL SYSTEM FOR IMPROVING PUMP RESPONSE AND DYNAMIC MATCHING OF PUMP AND VALVE

This application claims the benefit of prior provisional patent application Ser. No. 60/153,792 filed Sep. 14, 1999.

TECHNICAL FIELD

This invention relates generally to an apparatus for controlling a hydraulic circuit, and more particularly, to an apparatus for controlling the flow characteristics of an actuator.

BACKGROUND ART

Hydraulic drive systems are utilized in construction equipment such as hydraulic excavators, backhoe loaders, and end loaders. Known systems typically have a displacement controlled pump and one or more main flow control valves which are used to controllably actuate various hydraulic actuators associated with the vehicle. Normally, such drive systems are controlled through a series of operator control levers which are coupled to the control valves mechanically or hydraulically. The main control valve may include four independent valves which are used to control fluid flow from the pump to the actuator and to a tank or reservoir. Typically in this type of drive system the pump displacement changes much slower than the valve displacement. When the drive system shuts off, the valves in the main control valve shut off faster than the pump can destroke. This results in a volume of fluid or oil being trapped in the system which causes a large and sudden increase in the pump outlet pressure which can lead to undue wear on the pump.

Another contributor to the solution would be in the pump control. By adding the inverse of the current command to the command itself in the direction of command change, the response of the pump at startup and shutdown can be improved.

Accordingly, the present invention is directed to overcoming one or more of the problems as set forth above.

DISCLOSURE OF THE INVENTION

In one aspect of the present invention a hydraulic control system has a pump for delivering fluid under pressure from a fluid reservoir, a hydraulic actuator selectively driven by the fluid, the system comprises a main flow control valve connected between the pump and the actuator for selectively providing the fluid to and from the actuator, and a control unit connected to the main flow control valve for controlling operation of the main flow control valve to control the rate of change of the area of the main flow control valve relative to the delivery of fluid from the pump. The control unit is also connected to the pump and controls displacement in response to either a flow command or in desired pressure.

In another aspect of the present invention a hydraulic control system having a pump for delivering fluid under pressure from a fluid reservoir, a hydraulic actuator selectively driven by the fluid, the system comprises a main flow control valve connected between the pump, the actuator, and the reservoir for selectively providing fluid to and from the actuator, the main flow control valve comprising four valves with each of the valves being selectively operated to further control the flow of fluid to and from the actuator, and a control unit connected to each of the valves and the pump which limits the rate of change of each of the valve areas separately, and which commands the pump flow based on the flow requested by the valves and rate of change of that request.

BRIEF DESCRIPTION OF THE DRAWINGS

For a better understanding of the present invention, reference may be made to the accompanying drawings in which:

FIG. 6 is a block diagram of a method of operation of the hydraulic control system when the pump operates near zero displacement.

BEST MODE FOR CARRYING OUT THE INVENTION

Figure 1:
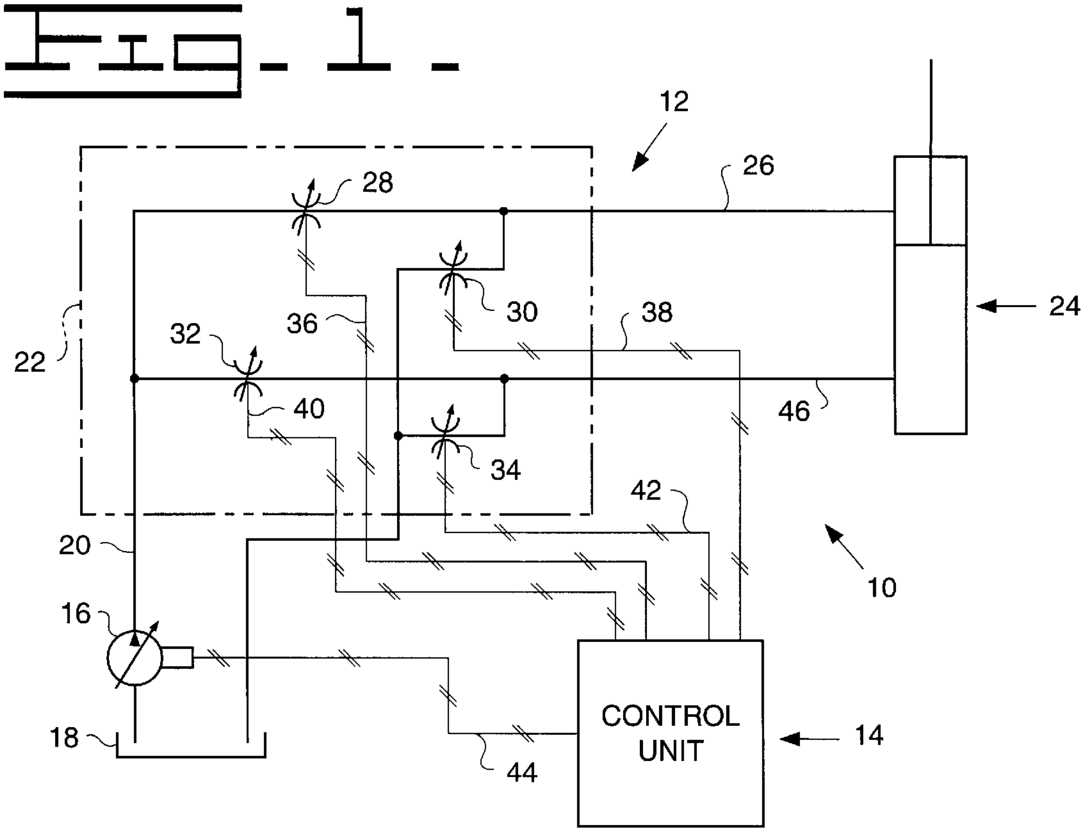
FIG. 1 is a block diagram of a hydraulic control system constructed according to the present invention.

Referring now to the drawings, FIG. 1 illustrates a hydraulic control system 10 of the present invention. The hydraulic control system 10 comprises a hydraulic circuit 12 and an electrical control system or unit 14. The control unit 14 may be, by way of example, a microprocessor, a microcontroller, electrical components, or any suitable logic circuit or integrated circuit. The hydraulic circuit 12 includes a displacement controlled hydraulic pump 16 for delivering. a fluid under pressure from a tank or fluid reservoir 18 to a supply line 20. The supply line 20 is connected to a main flow control valve 22 which supplies the fluid to an actuator 24 through a supply line 26. The main flow control valve 22 consists of control valves 28, 30, 32, and 34 which are operated to control the flow of hydraulic fluid to and from the actuator 24. The control valves 28–34 are each connected via electrical wires 36, 38, 40, and 42, respectively, to the electrical control system 14. Each of the control valves 28–34 is controlled by electrical signals sent over the wires 36–42 which are generated by the electrical control system 14. The control system 14 may also be connected to the pump 16 by a lead 44 to control the operation of the pump 16 and to determine the status of the pump 16. The actuator 24 is also connected to the main control valve 22 by a return line 46 which is used to return the hydraulic fluid to the fluid reservoir 18.

The actuator 24 is capable of being moved by being either extended or retracted and may include a rod, a cylinder, and a head, all of which are not illustrated. Velocity commands, such as the pressing of a lever (not shown), for movement of the actuator 24 in either of these two positions are converted by the control system 14 to flow commands for the pump 16. The control valves 28–34 control flow of the fluid into and out of the actuator 24 in response to the requested mode of operation of the actuator 24. In particular, to extend the actuator 24, the control valve 32 opens and fluid is allowed to flow from the pump 16 to the actuator 24 and the control valve 30 opens and fluid flows from the actuator 24 to the reservoir 18. In order to retract the actuator 24, the control valve 28 opens and fluid flows from the pump 16 to the actuator 24 and the control valve 34 opens to allow fluid flow from the actuator 24 to the reservoir 18. This hydraulic control system 10 is closed-center, meaning that there is no normally open flow area from the pump 16 to the reservoir 18. The main valve 22, the actuator 24, and the lines 20, 26, and 46 connecting pump 16 and reservoir 18 together can be defined a single circuit.

Typically, in these type of systems, the displacement of the pump 16 changes much slower than the main flow control valve 22. When the system 10 shuts off the valves 28–34 shut off faster than the pump 16 can destroke and the result is a trapped volume of hydraulic fluid that causes a large and sudden increase in the outlet pressure of the pump 16. This sudden increase in pressure can cause undue wear on the pump 16. In order to reduce the undue wear on the pump, the control system 14 is capable of employing a variable rate limit on each of the valves 28–34. This permits the valves 30 and 34 to be shutoff faster than the valves 28 and 32. The valves 30 and 34 are actuator to reservoir valves because these valves 30 and 34 control the flow of fluid from the actuator 24 to the reservoir 18. Additionally, the valves 28 and 32 are pump to actuator valves because the valves 28 and 32 control the flow of the fluid from the pump 16 to the actuator 24. The actuator to reservoir valves 30 and 34 are critical to the control of the actuator 24. To stop the motion of the actuator 24 requires that these valves 30 and 34 be shutoff. The pump to actuator valves 28 and 32 are not as critical and these valves 28 and 32 may be left open longer to provide more volume for any left over pump flow to enter the hydraulic system 12 which reduces the severity of any pressure spike in the hydraulic system 12.

Additionally, the rates are set such that there is a partial overlap of areas of the pump to actuator valves 28 and 32 to avoid dead-heading the pump 16 in a command crossover situation.

Figure 2:
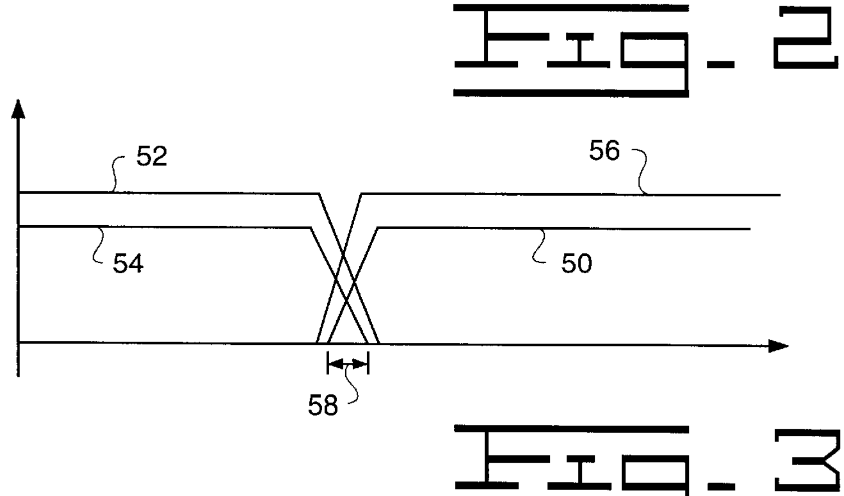
FIG. 2 is a graph illustrating the flow rate or characteristics of various valves in the hydraulic control system of the present invention.

The situation where the actuator 24 is commanded to stop is shown in FIG. 2. The flow areas for valves 30 and 32 are shown in curves 52 and 54 respectively. The time 58 is the time it takes the controller to shut off the actuator to tank valve 30, and is usually dictated by the stop time requirement for the actuator 24. The shutoff time for the pump to actuator valve 32 is set to match the pump destroke time.

Figure 3:
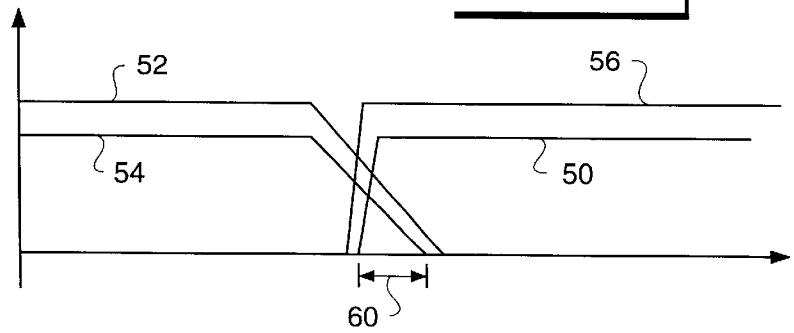
FIG. 3 is a graph illustrating the flow rate or characteristics of various valves in the hydraulic control system.

The situation where the actuator 24 changes direction of motion is shown in FIG. 3. Valves 30 and 34 follow flow area curves 52 and 56 respectively and ensure that the actuator 24 stops moving in one direction and starts moving in the other direction in a timely manner. Valve 32 closes off slowly as shown by curve 54 and ensures an overlap of flow areas with itself and valve 28, which opens quickly as shown in curve 50. For example, the area of overlap of the pump to actuator valves 28 and 32 is represented as 60 in FIG. 3.

Figure 4:
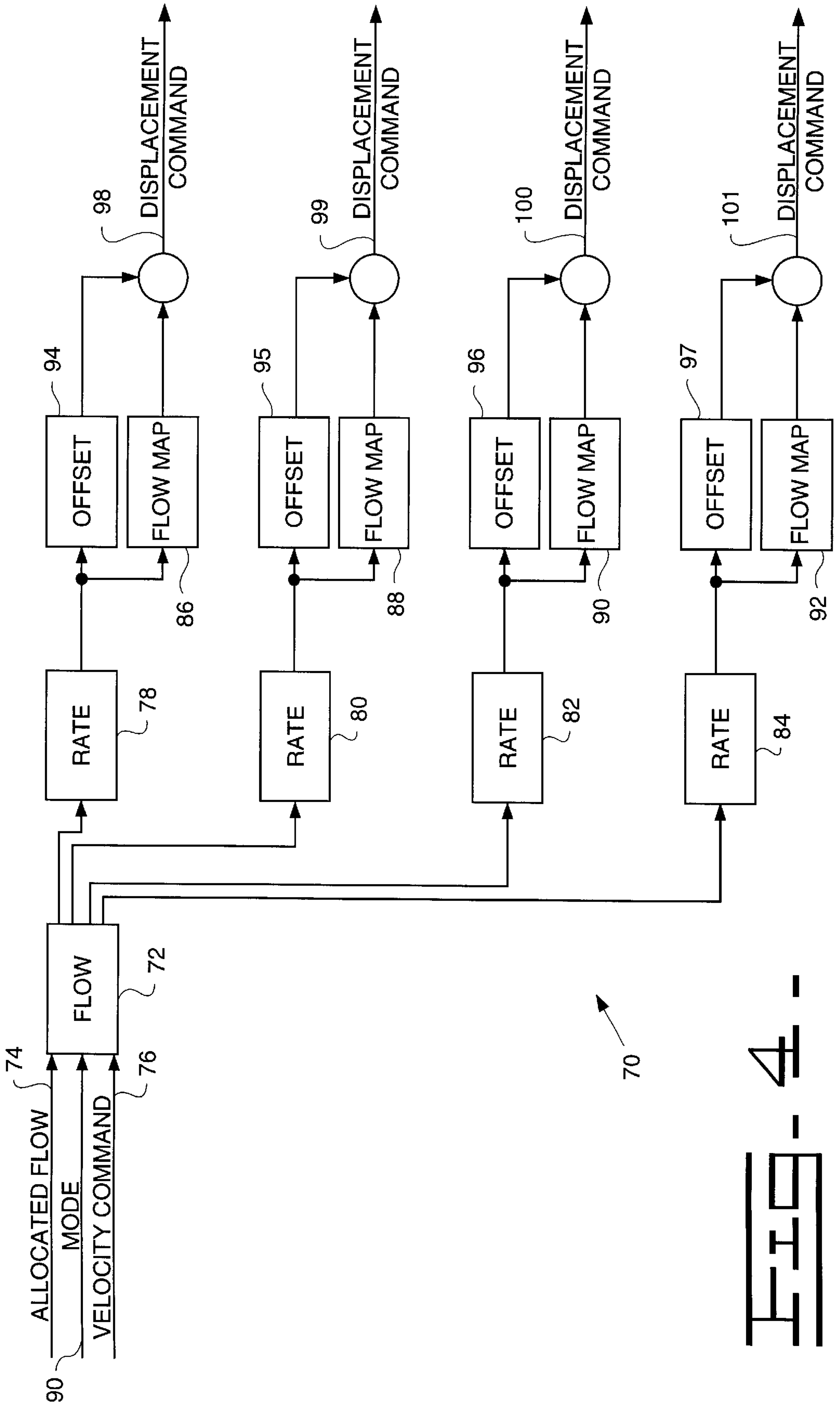
FIG. 4 is a block diagram of a method of operation of the hydraulic control system constructed according to the present invention.

Referring now to FIG. 4, a block diagram of a method 70 of operating the hydraulic control system 10 is shown which is capable of implementing the separate variable rate limits for the valves 28–34. eased on the allocated flow 74, mode 90 and velocity command 76 for the circuit, flows are determined for each of the four valves 28–34. The flows then go through four separate variable rate limits 78–84. That is to say, based on the current flow command for each valve, there is a maximum allowable rate of change in either direction, increasing or decreasing flow. This rate limit results in a flow command that is then sent to a flow map 86–92 that uses the flow characteristics of the valve to determine the displacement command 98–101. The offset block 94–97 uses flow and mode to add in the deadband of the valve whenever there is a flow command.

Figure 5:
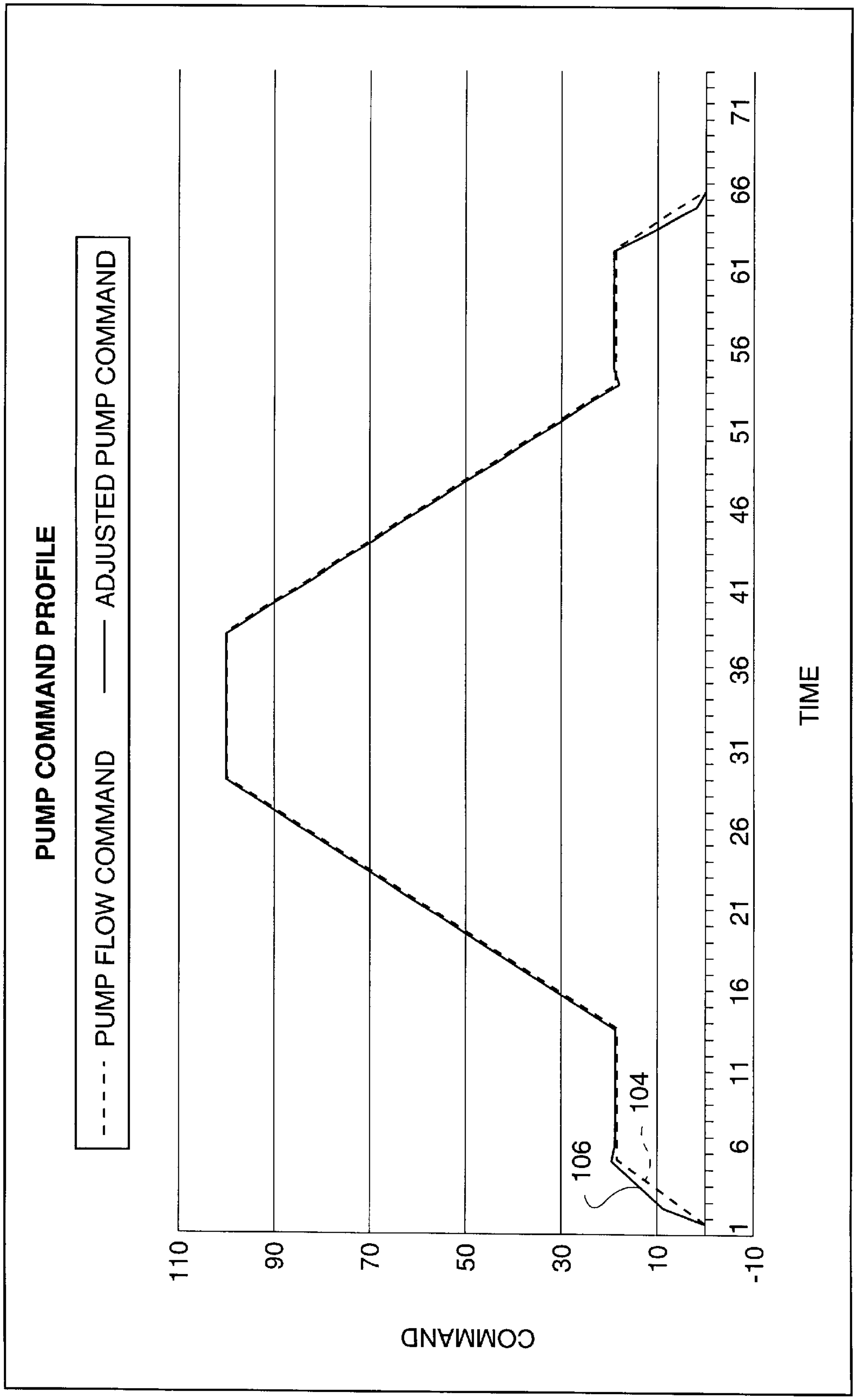
FIG. 5 is a graph illustrating the pump command profile.
Figure 5:
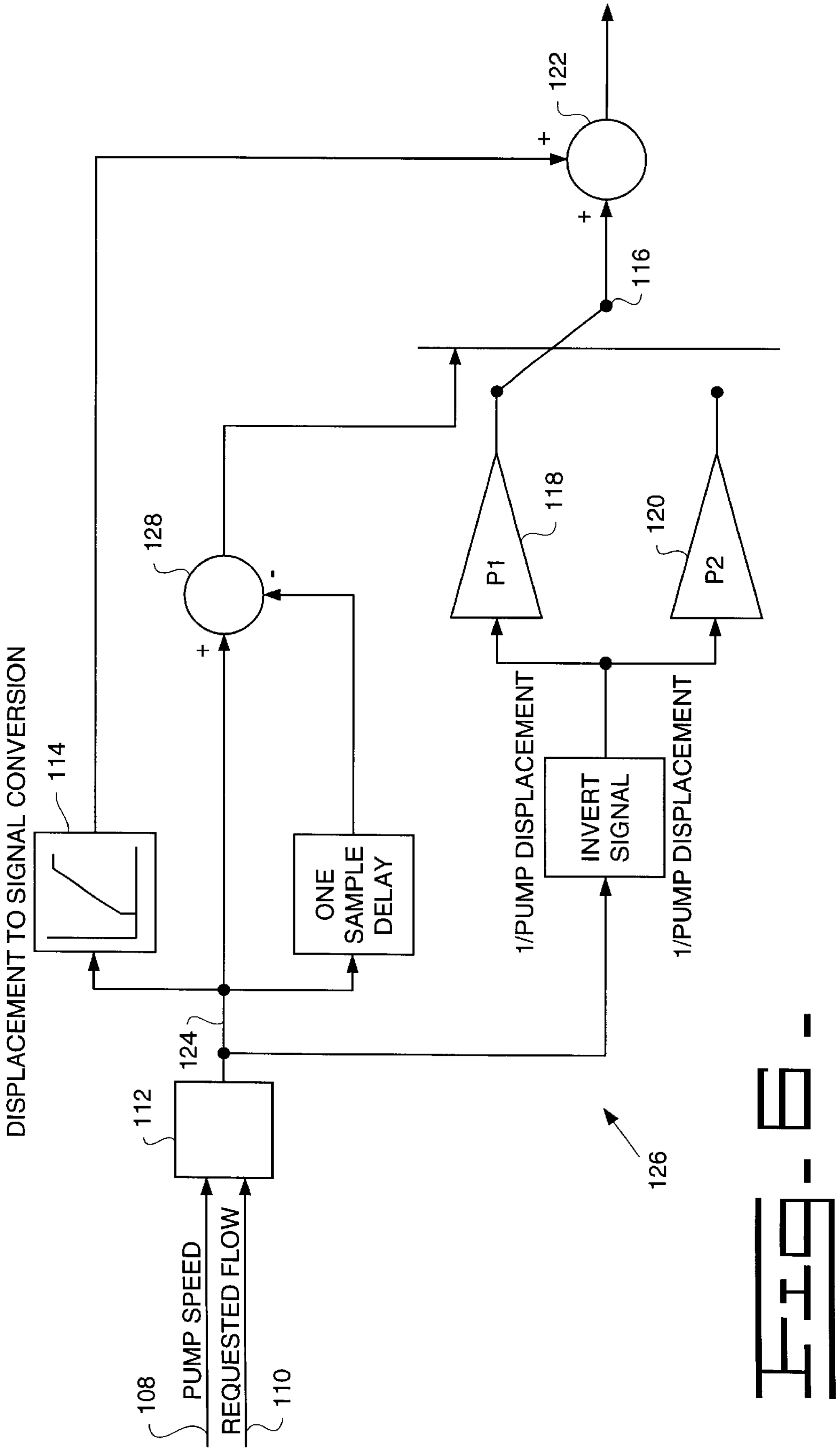

FIG. 5 shows the situation where the pump is commanded to flow varying amounts. Curve 104 represents the sum of allocated flow 74 for each circuit, while curve 106 represents the flow command modified by adding the inverse of the previous flow command to the current flow command in the direction of change. For small commands, the previous command is larger than for large commands, so its effect is greater when the pump is initiating or shutting off flow. The result is that when a circuit first starts, the pump jumps ahead of the flow command and starts the actuator moving, and when the circuit stops, the pump reduces the command ahead of the actual flow command to get the pump to zero displacement as soon as possible. When the pump is flowing in the operating range, the inverse of the flow command is small and has minimal effect.

Referring now to FIG. 6, a block diagram of a method 126 of operating the hydraulic control system 10 is shown which is capable of adding to the flow command to make the pump more responsive near zero displacement. The pump rotation rate 108 and the sum allocated flow 110 for each circuit is input into block 112 that determines the pump displacement 124 required to meet the flow request. That displacement is converted to a current command in block 114. The displacement command also goes into blocks 118 and 120, where it is inverted and multiplied by gains $P_1$ and $P_2$. By comparing the previous command to current command, the direction of change 128 in the command is detected. Based on the direction of change 128 in the displacement command, the output of either 120 or 118 is selected as 116 and summed with the current command in block 122. When there is no displacement command, the divisor in block 118 and 120 is set to a minimum value. When there is no change in the command, 118 and 120 outputs are set to zero.

Industrial Applicability

The present hydraulic control system 10 is adapted to controllably actuate a hydraulic circuit having a main flow control valve 22 in order to control the rate of change of the area of the valve 22 relative to the pump flow. The hydraulic control system 10 is also capable of determining whether the system 10 is in one or more modes of operation in order to control the main flow control valve 22. For example, if an operator wants to extend the cylinder or actuator 24, the main flow control valve 22 must route fluid flow from the pump 16 to the cylinder head associated with the actuator 24 and from the cylinder rod associated with the actuator 24 to the hydraulic tank 18. If the operator desires to retract the actuator 24, then the main flow control valve 22 must route flow from pump 16 to the cylinder rod and from the cylinder head to the hydraulic reservoir 18. Valve rate limits and pump command inversion, 118 or 120 depending on direction of change of command, are used to protect the hydraulic circuit from generating high pressures within the hydraulic circuit during periods of operation. The hydraulic control system 10 controllably actuates each of the valves 28–34 within the main flow control valve 22 according to which mode of operation the system 10 is in at the time.

Other aspects, objects and advantages of the present invention can be obtained from a study of the drawings, the disclosure and the appended claims.

What is claimed is:

1. A hydraulic control system having a pump for delivering fluid under pressure from a fluid reservoir, a hydraulic actuator selectively driven by the fluid, the system comprising:

- a main flow control valve connected between the pump and the actuator for selectively providing the fluid to and from the actuator; and a control unit connected to the main flow control valve for controlling operation of the main flow control valve to limit the rate of change of the area of the main flow control valve dependent on the rate of delivery of fluid from the pump.

2. The hydraulic control system of claim 1 wherein the main flow control valve comprises four valves which are operated to control the flow of fluid to and from the actuator.

3. The hydraulic control system of claim 2 wherein two of the valves are connected between the pump and the actuator and the other two valves are connected between the actuator and the fluid reservoir.

4. The hydraulic control system of claim 3 wherein the four valves are each connected to the control unit and the control unit is capable of shutting off the valves which are connected between the actuator and the fluid reservoir faster than the valves which are connected between the pump and the actuator.

5. The hydraulic control system of claim 1 wherein the control unit is connected to the pump and is capable of determining a requested pump flow and any change in the requested pump flow.

6. The hydraulic control system of claim 5 wherein the control unit is connected to the pump and is capable of increasing or decreasing the actual pump flow command to the pump proportional to the inverse of the current pump command.

7. A hydraulic control system having a pump for delivering fluid under pressure from a fluid reservoir, a hydraulic actuator selectively driven by the fluid, the system comprising:

a main flow control valve connected between the pump, the actuator, and the reservoir for selectively providing fluid to and from the actuator, the main flow control valve comprising four valves with each of the valves being selectively operated to further control the flow of fluid to and from the actuator; and a control unit connected to each of the valves of the main flow control valve for variably limiting the rate of change in displacement of each of the valves.

8. The hydraulic control system of claim 1 wherein two of the valves are connected between the pump and the actuator and the other two valves are connected between the actuator and the fluid reservoir.

9. The hydraulic control system of claim 8 wherein the control unit is capable of shutting off the valves which are connected between the actuator and the fluid reservoir faster than the valves which are connected between the pump and the actuator.

10. The hydraulic control system of claim 7 wherein the control unit is connected to the pump and is capable of determining whether the pump is shutting off and whether the requested pump flow is zero.

11. A method of operating a hydraulic control system having a pump for delivering fluid under pressure from a fluid reservoir and a hydraulic actuator selectively driven by the fluid, the method comprising the steps of:

selectively providing the fluid to and from the actuator by providing a main flow control valve connected between the pump and the actuator; and controlling the operation of the main flow control valve to limit the rate of change of the area of the main flow control valve dependent upon the rate of delivery of fluid from the pump.

* * * * *

UNITED STATES PATENT AND TRADEMARK OFFICE

CERTIFICATE OF CORRECTION

PATENT NO. : 6,446,433 B1
DATED : September 10, 2002
INVENTOR(S) : Bradford J. Holt et al.

It is certified that error appears in the above-identified patent and that said Letters Patent is hereby corrected as shown below:

Column 6,
Line 8, remove "claim 1" and replace with -- claim 7 --.

Signed and Sealed this

Twenty-fourth Day of December, 2002

JAMES E. ROGAN
*Director of the United States Patent and Trademark Office*